US012791753B2

(12) United States Patent
Li et al.

(10) Patent No.: US 12,791,753 B2
(45) Date of Patent: Nov. 10, 2026

(54) METHOD AND DEVICE FOR CALIBRATING DEPTH OF OPTICAL FIBRE IN WELL

(71) Applicants: China National Petroleum Corporation, Beijing (CN); BGP Inc., China National Petroleum Corporation, Hebei (CN)

(72) Inventors: Yanpeng Li, Hebei (CN); Congwei Liu, Hebei (CN); Yanbin Zhang, Hebei (CN)

(73) Assignees: China National Petroleum Corporation, Beijing (CN); BGP Inc., China National Petroleum Corporation, Hebei (CN)

( * ) Notice: Subject to any disclaimer, the term of this patent is extended or adjusted under 35 U.S.C. 154(b) by 352 days.

(21) Appl. No.: 18/287,216

(22) PCT Filed: Jun. 30, 2022

(86) PCT No.: PCT/CN2022/102880
§ 371 (c)(1),
(2) Date: Oct. 17, 2023

(87) PCT Pub. No.: WO2023/123966
PCT Pub. Date: Jul. 6, 2023

(65) Prior Publication Data

US 2024/0201415 A1 Jun. 20, 2024

(30) Foreign Application Priority Data

Dec. 30, 2021 (CN) ........................ 202111648600.5

(51) Int. Cl.
*G01V 13/00* (2006.01)
*E21B 49/00* (2006.01)
(Continued)

(52) U.S. Cl.
CPC .............. *G01V 13/00* (2013.01); *E21B 49/00* (2013.01); *G01V 1/226* (2013.01); *G01V 1/50* (2013.01)

(58) Field of Classification Search
CPC .......... E21B 49/00; G01V 1/50; G01V 1/226; G01V 1/305; G01V 1/307; G01V 13/00;
(Continued)

(56) References Cited

U.S. PATENT DOCUMENTS 4,722,603 A * 2/1988 Graebner ............ G01B 11/161
356/477
9,250,112 B2 * 2/2016 Godfrey ................. G01F 1/661
(Continued)

FOREIGN PATENT DOCUMENTS

CN 104656142 A 5/2015
CN 108871620 A 11/2018
(Continued)

OTHER PUBLICATIONS

International Search Report of PCT/CN2022/102880 dated Sep. 7, 2022 [PCT/ISA/210].
(Continued)

*Primary Examiner* — John Fitzgerald
(74) *Attorney, Agent, or Firm* — Sughrue Mion, PLLC

(57) ABSTRACT

Disclosed are an improved method and device for calibrating the depth of an optical fibre in a well. The method includes acquiring borehole seismic wave field data based on an optical fibre acoustic wave sensor; determining first arrival time information based on the borehole seismic wave field data; determining a downgoing wave first arrival amplitude based on the first arrival time information and the borehole seismic wave field data; determining an optical fibre amplitude feature point based on the downgoing wave first arrival amplitude; determining a wellhead initial posi-
(Continued)

tion and a receiving point spacing of the optical fibre in the well based on the optical fibre amplitude feature point and logging curve feature points; and determining depth calibration information of the optical fibre in the well based on the wellhead initial position and the receiving point spacing.

10 Claims, 5 Drawing Sheets

(51) Int. Cl.
*G01V 1/22* (2006.01)
*G01V 1/50* (2006.01)

(58) Field of Classification Search
CPC ..... G01V 2210/161; G01V 2210/1429; G01H 9/004
USPC ...... 367/27, 29, 30; 73/1.79, 861.27, 861.28
See application file for complete search history.

(56) References Cited

U.S. PATENT DOCUMENTS

| | | | | |
|---|---|---|---|---|
| 9,631,972 | B2 * | 4/2017 | Hill | G01H 9/004 |
| 10,392,882 | B2 * | 8/2019 | Dickenson | E21B 47/135 |
| 10,495,779 | B2 * | 12/2019 | LeBlanc | G06Q 50/02 |
| 11,275,193 | B2 * | 3/2022 | Ray | G01V 1/28 |
| 11,414,982 | B2 * | 8/2022 | Granville | E21B 47/06 |
| 2008/0239872 | A1 * | 10/2008 | Miller | E21B 47/18 367/83 |
| 2013/0298635 | A1 * | 11/2013 | Godfrey | G01H 9/004 73/1.16 |
| 2014/0150523 | A1 * | 6/2014 | Stokely | E21B 47/135 73/152.58 |
| 2018/0274355 | A1 * | 9/2018 | Kona | E21B 47/07 |
| 2019/0004195 | A1 | 1/2019 | Hornman et al. | |
| 2021/0215037 | A1 * | 7/2021 | Stewart | E21B 47/00 |
| 2023/0072038 | A1 | 3/2023 | Li et al. | |

FOREIGN PATENT DOCUMENTS

| | | | |
|---|---|---|---|
| CN | 112099086 | A | 12/2020 |
| CN | 112305616 | A | 2/2021 |
| CN | 112346129 | A | 2/2021 |
| CN | 112727447 | A | 4/2021 |
| CN | 113009579 | A | 6/2021 |
| EP | 3754082 | A1 | 12/2020 |
| WO | 2020/251554 | A1 | 12/2020 |
| WO | 2021/155754 | A1 | 8/2021 |

OTHER PUBLICATIONS

Extended European Search Report dated Aug. 8, 2024 in Application No. 22913255.0.

T. M. Daley et al., “Field testing of modular borehole monitoring with simultaneous distributed acoustic sensing and geophone vertical seismic profiles at Citronella, Alabama”, Geophysical Prospecting, 2016, vol. 24, pp. 1318-1334 (17 pages total).

* cited by examiner

METHOD AND DEVICE FOR CALIBRATING DEPTH OF OPTICAL FIBRE IN WELL

CROSS REFERENCE TO RELATED APPLICATIONS

This application is a National Stage of International Application No. PCT/CN2022/102880 filed on Jun. 30, 2022, claiming priority based on Chinese Patent Application No. 202111648600.5 filed on Dec. 30, 2021.

FIELD OF THE INVENTION

The present disclosure relates to the field of optical fibre sensing technology, in particular to a method and device for calibrating the depth of an optical fibre in a well, a processor and a computer-readable storage medium.

BACKGROUND OF THE INVENTION

With the continuous development of science and technology, more and more new technologies are constantly applied in various fields of life and production. Since the data acquired by optical fibres has significant advantages such as high density sampling, high temperature and high pressure resistance and whole well section acquisition, the optical fibres are widely used in the field of borehole geophysics.

Reliable formation information can be obtained by directly coupling the optical fibres with the formation. However, in the process of processing the optical fibres into an armoured optical cable, there is a certain redundant length in order to adapt to the stretching of the cable, that is, the length of the optical cable is different from the length of the fibre core therein, and it is necessary to know the actual depth position of each receiving point of optical fibre sensing data when optical fibre sensing is applied in wells. In the prior art, firstly, the wellhead position is taped for depth zero setting in DAS output channels, and then the optical fibre detection tool OTDR (optical time-domain reflectometer) is used to measure the length of whole optical cable, and the length is compared with the length read by the cable counter to obtain the length correction coefficient, so as to calculate the accurate depth position of each optical fibre when the data is output.

However, in the actual application process, the existing depth calibration method is greatly influenced by the accuracy of the optical fibre detection tool OTDR and the counting accuracy of the above-mentioned cable counter, so there is a technical problem of insufficient calculation accuracy, and the actual needs of current technicians cannot be satisfied.

SUMMARY OF THE INVENTION

In order to overcome the above technical problems existing in the prior art, embodiments of the present disclosure provide a method for calibrating the depth of an optical fibre in a well, which performs de-noising processing on the actual seismic wave field data acquired by the optical fibre, and compares the existing logging data and the optical fibre seismic wave field data for analysis, so that the depth calibration information of the optical fibre is accurately determined, and the depth calibration accuracy is improved.

In order to achieve the above object, an embodiment of the present disclosure provides a method for calibrating the depth of an optical fibre in a well, comprising: acquiring borehole seismic wave field data based on an optical fibre acoustic wave sensor; determining first arrival time information based on the borehole seismic wave field data; determining a downgoing wave first arrival amplitude based on the first arrival time information and the borehole seismic wave field data; determining an optical fibre amplitude feature point based on the downgoing wave first arrival amplitude; determining a wellhead initial position and a receiving point spacing of the optical fibre in the well based on the optical fibre amplitude feature point and logging curve feature points; and determining depth calibration information of the optical fibre in the well based on the wellhead initial position and the receiving point spacing.

Preferably, the method further comprises: before determining the downgoing wave first arrival amplitude, optimising the borehole seismic wave field data based on a preset filtering algorithm to obtain an optimised downgoing wave field; and determining the downgoing wave first arrival amplitude based on the optimised downgoing wave field and the first arrival time information.

Preferably, determining the downgoing wave first arrival amplitude based on the first arrival time information and the borehole seismic wave field data comprises: determining a preset short time window based on the first arrival time information; determining specific seismic wave field data within the preset short time window; and determining a downgoing wave first arrival amplitude based on the specific seismic wave field data.

Preferably, determining the amplitude feature point based on the downgoing wave first arrival amplitude comprises: performing a spherical spreading amplitude compensation operation on the downgoing wave first arrival amplitude to obtain a compensated amplitude; generating a relative impedance curve based on the compensated amplitude; acquiring preset logging data; and determining the corresponding optical fibre amplitude feature point based on the preset logging data and the relative impedance curve.

Preferably, the method further comprises: determining a borehole sampling parameter of the optical fibre in the well based on the depth calibration information; performing a depth resampling operation based on the borehole sampling parameter to obtain resampled data; and generating updated depth calibration information based on the resampled data.

Correspondingly, the present disclosure also provides a device for calibrating the depth of an optical fibre in a well, comprising: a seismic wave field data acquisition unit, used for acquiring borehole seismic wave field data based on an optical fibre acoustic wave sensor; a first arrival time determination unit, used for determining first arrival time information based on the borehole seismic wave field data; a downgoing wave first arrival amplitude determination unit, used for determining a downgoing wave first arrival amplitude based on the first arrival time information and the borehole seismic wave field data; a feature point determination unit, used for determining an optical fibre amplitude feature point based on the downgoing wave first arrival amplitude; an optical fibre parameter determination unit, used for determining a wellhead initial position and a receiving point spacing of the optical fibre in the well based on the optical fibre amplitude feature point; and a depth calibration unit, used for determining depth calibration information of the optical fibre in the well based on the wellhead initial position and the receiving point spacing.

Preferably, the device further comprises an optimisation unit, used for: optimising the borehole seismic wave field data based on a preset filtering algorithm to obtain an optimised downgoing wave field; the downgoing wave first arrival amplitude determination unit is further used for determining the downgoing wave first arrival amplitude based on the optimised downgoing wave field and the first arrival time information.

Preferably, the downgoing wave first arrival amplitude determination unit comprises: a time window determination module, used for determining a preset short time window based on the first arrival time information; a data determination module, used for determining specific seismic wave field data within the preset short time window; and a first arrival amplitude determination module, used for determining a downgoing wave first arrival amplitude based on the specific seismic wave field data.

Preferably, the feature point determination unit comprises: a compensation module, used for performing a spherical spreading amplitude compensation operation on the downgoing wave first arrival amplitude to obtain a compensated amplitude; an impedance information generation module, used for generating a relative impedance curve based on the compensated amplitude; a logging data acquisition module, used for acquiring preset logging data; and a feature point generation module, used for determining the corresponding optical fibre amplitude feature point based on the preset logging data and the relative impedance curve.

Preferably, the device further comprises a resampling unit, used for: determining a borehole sampling parameter of the optical fibre in the well based on the depth calibration information; performing a depth resampling operation based on the borehole sampling parameter to obtain resampled data; and generating updated depth calibration information based on the resampled data.

In another aspect, the present disclosure also provides a processor, configured to perform the method for calibrating the depth of an optical fibre in a well provided by the present disclosure.

In another aspect, the present disclosure also provides a computer-readable storage medium, storing a computer program therein, wherein the computer program, when executed by a processor, implements the method for calibrating the depth of an optical fibre in a well provided by the present disclosure.

Through the technical solutions provided by the present disclosure, the present disclosure has at least the following technical effects:

by improving the existing optical fibre depth correction method, de-noising processing is performed on the seismic wave field data acquired by the field optical fibre, and then the wellhead initial position and receiving point spacing of the optical fibre in the well are accurately determined in combination with the existing logging data, so that the depth calibration position of the downhole optical fibre can be accurately determined, and the depth calibration accuracy is improved.

Other features and advantages of embodiments of the present disclosure will be described in detail in the Detailed Description section that follows.

BRIEF DESCRIPTION OF DRAWINGS

The accompanying drawings are intended to provide a further understanding of the embodiments of the present disclosure and constitute a part of this specification, and together with the detailed description below, serve to explain, but not to limit, the embodiments of the present disclosure. In the drawings.

DETAILED DESCRIPTION OF THE EMBODIMENTS

The specific implementations of the embodiments of the present disclosure will be described in detail with reference to the accompanying drawings. It should be understood that the specific implementations described here are only used to illustrate and explain the embodiments of the present disclosure, and are not used to limit the embodiments of the present disclosure.

The terms "system" and "network" in the embodiments of the present disclosure can be used interchangeably. "plurality of" means two or more, and in view of this, "plurality of" can also be understood as "at least two" in the embodiments of the present disclosure. "and/or", which describes the association relationship of associated objects, indicates that three relationships can exist, for example, A and/or B, which can mean that A exists alone, A and B exist together, and B exists alone. In addition, the character "/", unless otherwise specified, generally indicates that the associated objects before and after the "/" are in an "OR" relationship. In addition, it should be understood that in the description of the embodiments of the present disclosure, words such as "first" and "second" are only used for the purpose of distinguishing descriptions, and cannot be understood as indicating or implying relative importance, nor can they be understood as indicating or implying the order.

The background of the present disclosure will be first described below.

When the formation is observed, seismic wave field and other data of the formation are acquired by disposing an optical fibre in a well, connecting the optical fibre to a DAS (distributed acoustic sensor), and collecting information of the optical fibre by the DAS. However, in the actual application process, the prior art cannot accurately detect the exact position of the optical fibre in the well, thereby causing great trouble for the subsequent analysis of the optical fibre sensing data.

Figure 1:
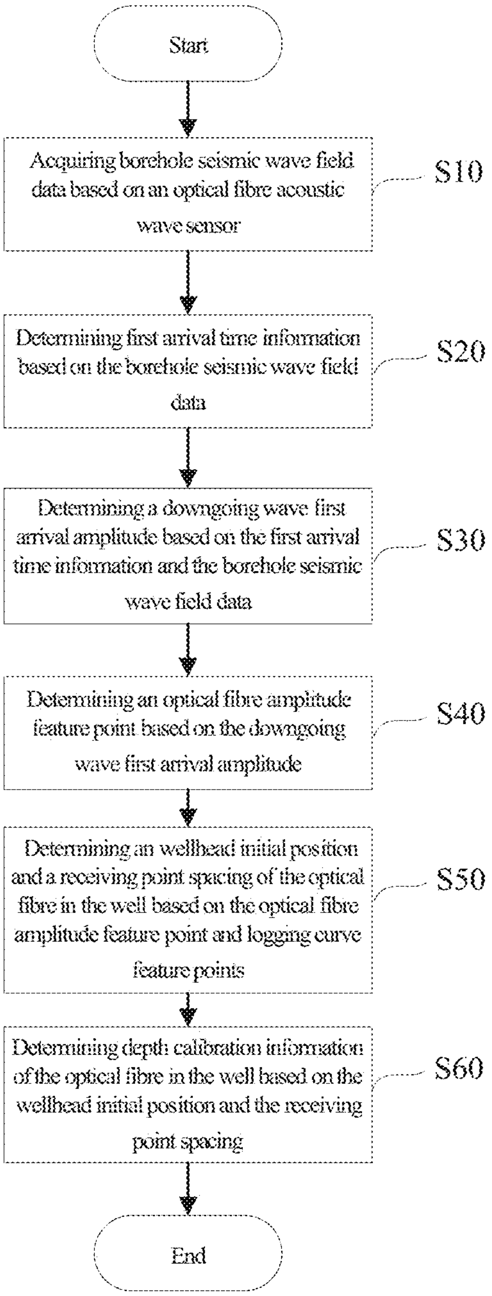
FIG. 1 is a specific implementation flowchart of a method for calibrating the depth of an optical fibre in a well according to an embodiment of the present disclosure.

In order to solve the above technical problem, referring to FIG. 1, an embodiment of the present disclosure provides a method for calibrating the depth of an optical fibre in a well, comprising:

S10) acquiring borehole seismic wave field data based on an optical fibre acoustic wave sensor;

S20) determining first arrival time information based on the borehole seismic wave field data;

S30) determining a downgoing wave first arrival amplitude based on the first arrival time information and the borehole seismic wave field data;

S40) determining an optical fibre amplitude feature point based on the downgoing wave first arrival amplitude;

S50) determining a wellhead initial position and a receiving point spacing of the optical fibre in the well based on the optical fibre amplitude feature point and logging curve feature points; and S60) determining depth calibration information of the optical fibre in the well based on the wellhead initial position and the receiving point spacing.

In one possible implementation, borehole seismic wave field data is first acquired by excitation on the ground or in the well with an explosive source or an artificial vibroseis, and then the borehole seismic wave field data is collected by the optical fibre. At this time, first arrival time information is determined according to the borehole seismic wave field data, the first arrival time information can be obtained by a preset first arrival picking method, which includes, but is not limited to, a maximum energy method, a short-term average/long-term average method, a cross-correlation method, a phase tracking method, and the like. At this time, the downgoing wave first arrival amplitude can be determined based on the first arrival time information and the borehole seismic wave field data.

However, in the actual application process, there is a lot of noise in the borehole seismic wave field data that is initially acquired, and therefore, in order to improve the accuracy of subsequent processing, it is necessary to optimise the borehole seismic wave field data.

In the embodiment of the present disclosure, the method further comprises: before determining the downgoing wave first arrival amplitude, optimising the borehole seismic wave field data based on a preset filtering algorithm to obtain an optimised downgoing wave field; and determining the downgoing wave first arrival amplitude based on the optimised downgoing wave field and the first arrival time information.

After the above borehole seismic wave field data is acquired and before the downgoing wave first arrival amplitude is determined, the borehole seismic wave field data can be optimised by methods such as a median filtering method or a mean filtering method, so as to remove upgoing waves in the borehole seismic wave field data, eliminate the interference effects of upgoing waves in the original borehole seismic wave field data, and improve the accuracy of subsequent data processing, and at this time, the downgoing wave first arrival amplitude can be determined based on the optimised information and the acquired first arrival time information.

Figure 2:
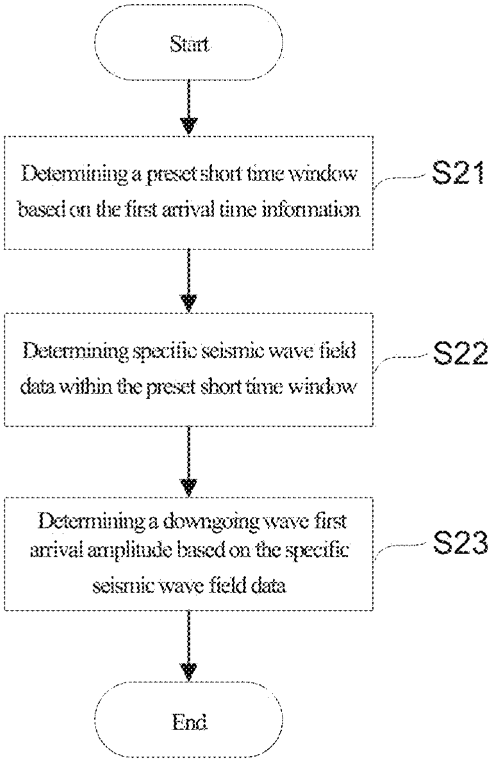
FIG. 2 is a specific implementation flowchart of determining a downgoing wave first arrival amplitude in a method for calibrating the depth of an optical fibre in a well according to an embodiment of the present disclosure.

Referring to FIG. 2, in an embodiment of the present disclosure, determining a downgoing wave first arrival amplitude based on the first arrival time information and the borehole seismic wave field data comprises:

S21) determining a preset short time window based on the first arrival time information;

S22) determining specific seismic wave field data within the preset short time window; and S23) determining a downgoing wave first arrival amplitude based on the specific seismic wave field data.

In one possible implementation, after the first arrival time information is acquired, a preset short time window is determined according to the first arrival time information, the preset short time window can be a dominant period in the first arrival time information or a time window having a length of 20-50 ms, and corresponding specific seismic wave field data is extracted within the preset short time window, a downgoing wave first arrival amplitude is determined according to the specific seismic wave field data, a root mean square amplitude or a maximum amplitude of the specific seismic wave field data can be determined as the downgoing wave first arrival amplitude information Ai, wherein i is a corresponding channel number for different channels in the well, and each channel has a corresponding first arrival amplitude. At this time, the optical fibre amplitude feature point is further determined according to the amplitude information.

Figure 3:
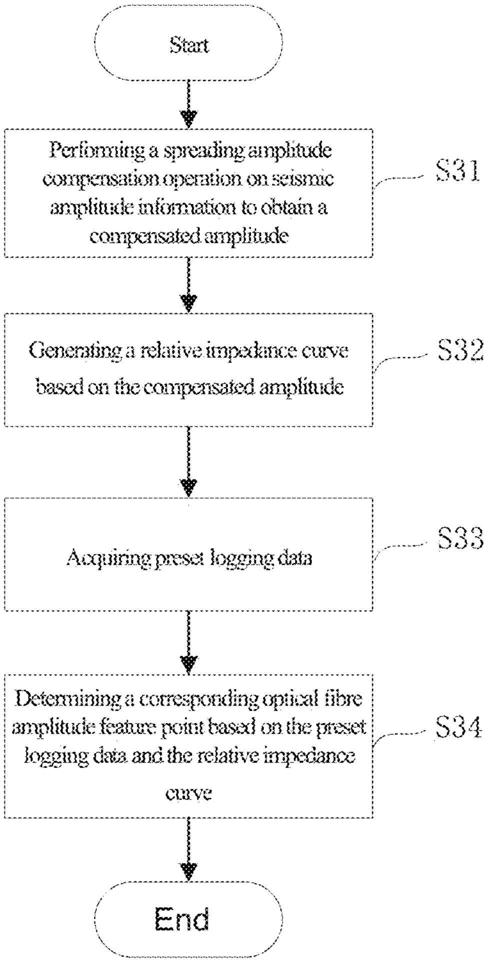
FIG. 3 is a specific implementation flowchart of determining feature points in a method for calibrating the depth of an optical fibre in a well according to an embodiment of the present disclosure.

Referring to FIG. 3, in an embodiment of the present disclosure, determining an optical fibre amplitude feature point based on the downgoing wave first arrival amplitude comprises:

S31) performing a spherical spreading amplitude compensation operation on the downgoing wave first arrival amplitude to obtain a compensated amplitude;

S32) generating a relative impedance curve based on the compensated amplitude;

S33) acquiring preset logging data; and

S34) determining corresponding optical fibre amplitude feature points based on the preset logging data and the relative impedance curve.

Figure 4:
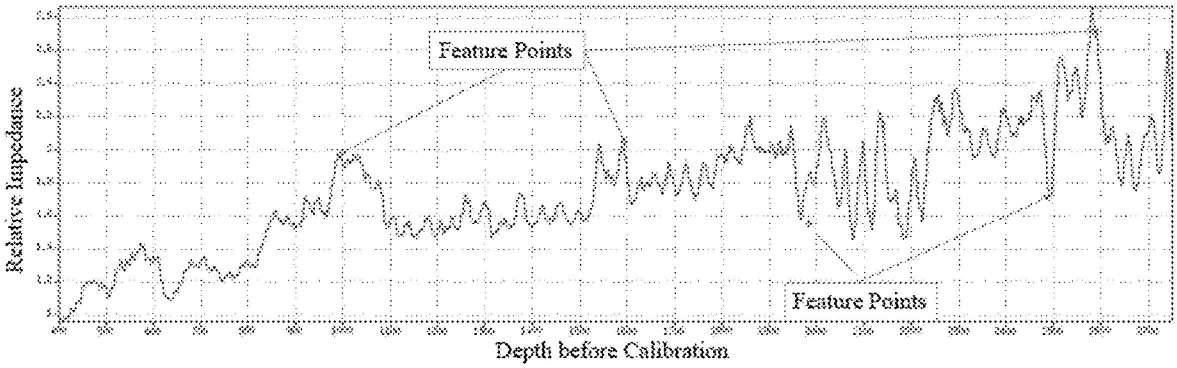
FIG. 4 is a schematic diagram of a relative impedance curve in a method for calibrating the depth of an optical fibre in a well according to an embodiment of the present disclosure.
Figure 5:
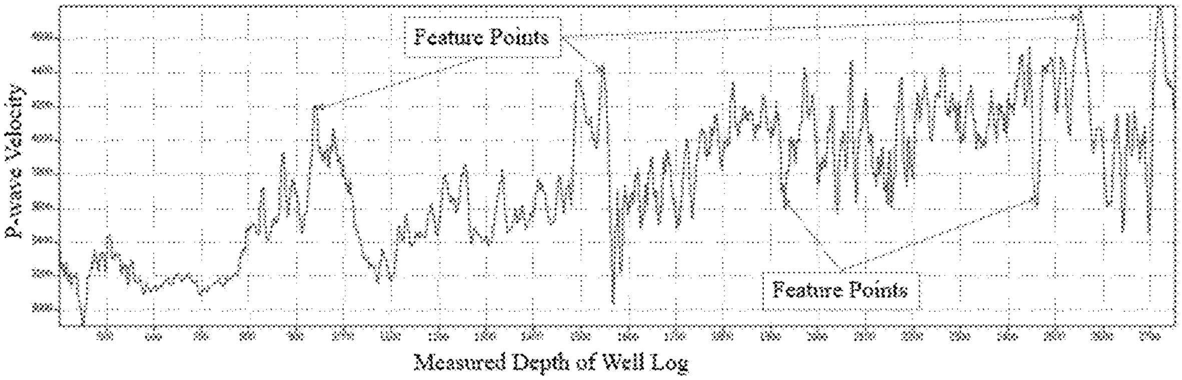
FIG. 5 is a schematic diagram of an acoustic logging velocity curve of a method for calibrating the depth of an optical fibre in a well according to an embodiment of the present disclosure.

In one possible implementation, in order to eliminate the influence caused by the seismic waves on the seismic amplitude information during propagation, a spherical spreading amplitude compensation operation is first performed on the downgoing wave first arrival amplitude of the optical fibre seismic wave field to eliminate the influence of amplitude variation caused by spherical spreading, and obtain the compensated information. The relative impedance curve is then obtained by reciprocal calculation based on the compensated information, the relative impedance curve is the relative impedance Ir, referring to FIG. 4, at this time, preset logging data is acquired, the preset logging data is an acoustic logging velocity curve, referring to FIG. 5, the preset logging data can include, but is not limited to, parameters such as velocity, density, gamma and impedance, and velocity Vel, density Den, gamma Gr, or impedance Imp of the corresponding well section can be calculated from the existing logging data, at this time, the above preset logging data is compared with the obtained relative impedance curve to determine the corresponding at least one optical fibre amplitude feature point. The feature points can be curve abrupt change points, which physically correspond to formation abrupt change points, for example, corresponding to channel numbers i1 and i2 on the Ir curve and corresponding to depths D1 and D2 on the logging curve.

Figure 6:
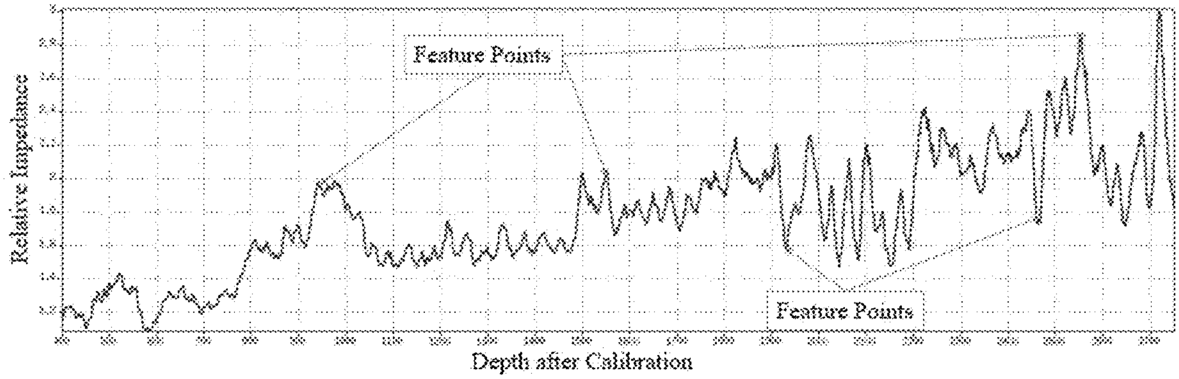
FIG. 6 is a schematic diagram of a relative impedance curve after depth calibration in a method for calibrating the depth of an optical fibre in a well according to an embodiment of the present disclosure.

At this time, the wellhead initial position and receiving point spacing of the optical fibre in the well are determined according to the optical fibre amplitude feature points. For example, in the embodiment of the present disclosure, the initial position i0 and the receiving point spacing ΔZ of the optical fibre in the well can be determined by the following calculation rules respectively:

$$\Delta Z=(D2-D1)/(i2-i1);$$

$$i0=(i1*D2-i2*D1)/(D2-D1);$$

at this time, the depth calibration information of the optical fibre in the well can be determined according to the wellhead initial position and the receiving point spacing, for example, the accurate downhole depth calibration information of the optical fibre in the well can be determined by performing depth resampling on the seismic channel below the depth zero point with ΔZ according to the initial position i0 and the receiving point spacing ΔZ obtained by calculation. FIG. 6 shows a relative impedance curve after depth calibration, and it can be seen that the relative impedance curve corresponds well to the acoustic logging velocity curve in terms of feature points.

In the embodiment of the present disclosure, the existing logging data and the borehole seismic wave field data detected by the optical fibre are analysed, and the borehole seismic wave field data is optimised, so that accurate seismic wave field data is obtained, and then accurate optical fibre depth calibration information is further obtained, which provides accurate data support for subsequent analysis of data collected through the optical fibre, and satisfies the actual demands of technicians. In order to further improve the accuracy of the data, in the embodiment of the present disclosure, the method further comprises: determining a borehole sampling parameter of the optical fibre in the well based on the depth calibration information; and performing a depth resampling operation based on the borehole sampling parameter to obtain resampled data.

For example, after the depth calibration information is determined for the first time, the borehole sampling parameter of the optical fibre in the well can be determined again according to the depth calibration information, a depth resampling operation is performed according to the well sampling parameter to obtain resampled data, the data processing process is performed according to the resampled data to obtain more accurate optical fibre depth calibration information, and the depth calibration information acquired for the first time is updated based on the more accurate optical fibre depth calibration information.

In the embodiment of the present disclosure, by repeating sampling for a plurality of times and comparing the feature points, the accuracy of data sampling and data analysis can be further improved, and the technical problem of large deviation existing in single data sampling and analysis can be effectively avoided, and thus the accuracy of data analysis can be further improved.

A device for calibrating the depth of an optical fibre in a well according to an embodiment of the present disclosure will now be described with reference to the accompanying drawings.

Figure 7:
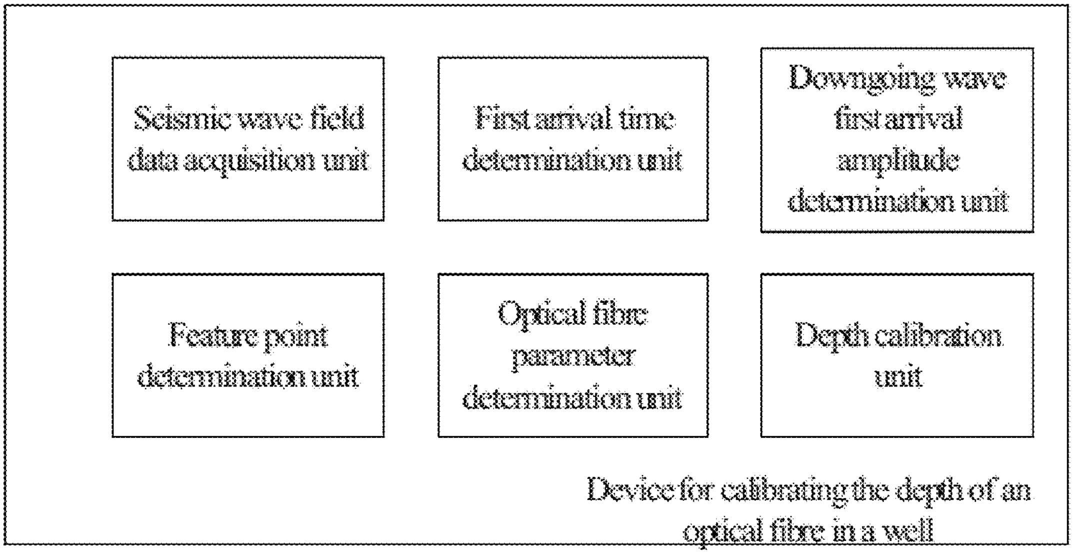
FIG. 7 is a structural schematic diagram of a device for calibrating the depth of an optical fibre in a well according to an embodiment of the present disclosure.

Referring to FIG. 7, based on the same inventive concept, embodiments of the present disclosure provide a device for calibrating the depth of an optical fibre in a well, comprising: a seismic wave field data acquisition unit, used for acquiring borehole seismic wave field data based on an optical fibre acoustic wave sensor; a first arrival time determination unit, used for determining first arrival time information based on the borehole seismic wave field data; a downgoing wave first arrival amplitude determination unit, used for determining a downgoing wave first arrival amplitude based on the first arrival time information and the borehole seismic wave field data; a feature point determination unit, used for determining an optical fibre amplitude feature point based on the downgoing wave first arrival amplitude; an optical fibre parameter determination unit, used for determining a wellhead initial position and a receiving point spacing of the optical fibre in the well based on the optical fibre amplitude feature point; and a depth calibration unit, used for determining depth calibration information of the optical fibre in the well based on the wellhead initial position and the receiving point spacing.

In an embodiment of the present disclosure, the device further comprises an optimisation unit, used for optimising the borehole seismic wave field data based on a preset filtering algorithm to obtain an optimised downgoing wave field; the downgoing wave first arrival amplitude determination unit is further used for determining the downgoing wave first arrival amplitude based on the optimised downgoing wave field and the first arrival time information.

In an embodiment of the present disclosure, the downgoing wave first arrival amplitude determination unit comprises a time window determination module, used for determining a preset short time window based on the first arrival time information; a data determination module, used for determining specific seismic wave field data within the preset short time window; and a first arrival amplitude determination module, used for determining a downgoing wave first arrival amplitude based on the specific seismic wave field data.

In an embodiment of the present disclosure, the feature point determination unit comprises a compensation module, used for performing a spherical spreading amplitude compensation operation on the downgoing wave first arrival amplitude to obtain compensated information; an impedance information generation module, used for generating a relative impedance curve based on the compensated amplitude; a logging data acquisition module, used for acquiring preset logging data; and a feature point generation module, used for determining corresponding optical fibre amplitude feature points based on the preset logging data and the relative impedance curve.

In an embodiment of the present disclosure, the device further comprises a resampling unit, used for determining a borehole sampling parameter of the optical fibre in the well based on the depth calibration information; performing a depth resampling operation based on the borehole sampling parameter to obtain resampled data; and generating updated depth calibration information based on the resampled data.

Further, embodiments of the present disclosure also provide a processor configured to perform the method for calibrating the depth of an optical fibre in a well according to the present disclosure.

Further, embodiments of the present disclosure also provide a computer-readable storage medium, storing a computer program therein, wherein the computer program, when executed by a processor, implements the method for calibrating the depth of an optical fibre in a well according to the present disclosure.

Optional implementations of embodiments of the present disclosure are described in detail above in conjunction with the accompanying drawings, however, the embodiments of the present disclosure are not limited to the specific details in the above implementations, and many simple variations can be made to the technical solutions of the embodiments of the present disclosure within the scope of the technical idea of the embodiments of the present disclosure, and these simple variations all belong to the protection scope of the embodiments of the present disclosure.

It needs to be further noted that the various specific features described in the above detailed description can be combined in any suitable manner without contradiction. In order to avoid unnecessary repetition, embodiments of the present disclosure will not explain any possible combinations.

Those skilled in the art will appreciate that all or part of the steps in the method for realising the embodiments described above may be performed by instructing related hardware through a program, the program is stored in a storage medium and includes instructions for causing a single-chip microcomputer, chip or processor to execute all or part of the steps of the method according to the various embodiments of the present application. The aforementioned storage medium includes a USB flash disk, a mobile hard disk, a read-only memory (ROM), a random access memory (RAM), a magnetic disk or an optical disk and other media that can store program codes.

In addition, various different implementations of the embodiments of the present disclosure can also be arbitrarily combined, as long as they do not violate the idea of the embodiments of the present disclosure, which should also be considered as the content disclosed in the embodiments of the present disclosure.

The invention claimed is:

1. A method for calibrating a depth of an optical fibre in a well, comprising:
- acquiring borehole seismic wave field data based on an optical fibre acoustic wave sensor;
- determining first arrival time information based on the borehole seismic wave field data;
- determining a downgoing wave first arrival amplitude based on the first arrival time information and the borehole seismic wave field data;
- determining an optical fibre amplitude feature point based on the downgoing wave first arrival amplitude;
- determining a wellhead initial position and a receiving point spacing of the optical fibre in the well based on the optical fibre amplitude feature point and logging curve feature points;
- determining depth calibration information of the optical fibre in the well based on the wellhead initial position and the receiving point spacing,
- determining a borehole sampling parameter of the optical fibre in the well based on the depth calibration information;
- performing a depth resampling operation based on the borehole sampling parameter to obtain resampled data;
- generating updated depth calibration information based on the resampled data, and
- calibrating the depth of the optical fibre in the well based on the updated depth calibration information.

2. The method according to claim 1, further comprising:
- before the determining the downgoing wave first arrival amplitude, optimising the borehole seismic wave field data based on a preset filtering algorithm to obtain an optimised downgoing wave field; and
- determining the downgoing wave first arrival amplitude based on the optimised downgoing wave field and the first arrival time information.

3. The method according to claim 1, wherein the determining the downgoing wave first arrival amplitude based on the first arrival time information and the borehole seismic wave field data comprises:
- determining a preset short time window based on the first arrival time information;
- determining specific seismic wave field data within the preset short time window; and
- determining the downgoing wave first arrival amplitude based on the specific seismic wave field data.

4. The method according to claim 1, wherein determining the optical fibre amplitude feature point based on the downgoing wave first arrival amplitude comprises:
- performing a spherical spreading amplitude compensation operation on the downgoing wave first arrival amplitude to obtain a compensated amplitude;
- generating a relative impedance curve based on the compensated amplitude;
- acquiring preset logging data; and
- determining the corresponding optical fibre amplitude feature point based on the preset logging data and the relative impedance curve.

5. A computer-readable storage medium storing a computer program, wherein the computer program, when executed by a processor, implements the method for calibrating the depth of an optical fibre in a well according to claim 1.

6. A device for calibrating a depth of an optical fibre in a well, comprising:
- a seismic wave field data acquisition unit, used for acquiring borehole seismic wave field data based on an optical fibre acoustic wave sensor;
- a first arrival time determination unit, used for determining first arrival time information based on the borehole seismic wave field data;
- a downgoing wave first arrival amplitude determination unit, used for determining a downgoing wave first arrival amplitude based on the first arrival time information and the borehole seismic wave field data;
- a feature point determination unit, used for determining an optical fibre amplitude feature point based on the downgoing wave first arrival amplitude;
- an optical fibre parameter determination unit, used for determining a wellhead initial position and a receiving point spacing of the optical fibre in the well based on the optical fibre amplitude feature point and logging curve feature points; and
- a depth calibration unit, used for determining depth calibration information of the optical fibre in the well based on the wellhead initial position and the receiving point spacing.

7. The device according to claim 6, further comprising an optimisation unit, used for:
- optimising the borehole seismic wave field data based on a preset filtering algorithm to obtain an optimised downgoing wave field;
- the downgoing wave first arrival amplitude determination unit is further used for determining the downgoing wave first arrival amplitude based on the optimised downgoing wave field and the first arrival time information.

8. The device according to claim 6, wherein the downgoing wave first arrival amplitude determination unit comprises:
- a time window determination module, used for determining a preset short time window based on the first arrival time information;
- a data determination module, used for determining specific seismic wave field data within the preset short time window; and
- a first arrival amplitude determination module, used for determining a downgoing wave first arrival amplitude based on the specific seismic wave field data.

9. The device according to claim 6, wherein the feature point determination unit comprises:
- a compensation module, used for performing a spherical spreading amplitude compensation operation on the downgoing wave first arrival amplitude to obtain a compensated amplitude;
- an impedance information generation module, used for generating a relative impedance curve based on the compensated amplitude;

a logging data acquisition module, used for acquiring preset logging data; and a feature point generation module, used for determining a corresponding optical fibre amplitude feature point based on the preset logging data and the relative impedance curve.

10. The device according to claim 6, further comprising a resampling unit, used for:

determining a borehole sampling parameter of the optical fibre in the well based on the depth calibration information;

performing a depth resampling operation based on the borehole sampling parameter to obtain resampled data; and generating updated depth calibration information based on the resampled data.

* * * * *